Sept. 19, 1950     I. L. McNALLY     2,522,528
REPEATER INDICATOR
Filed June 17, 1946
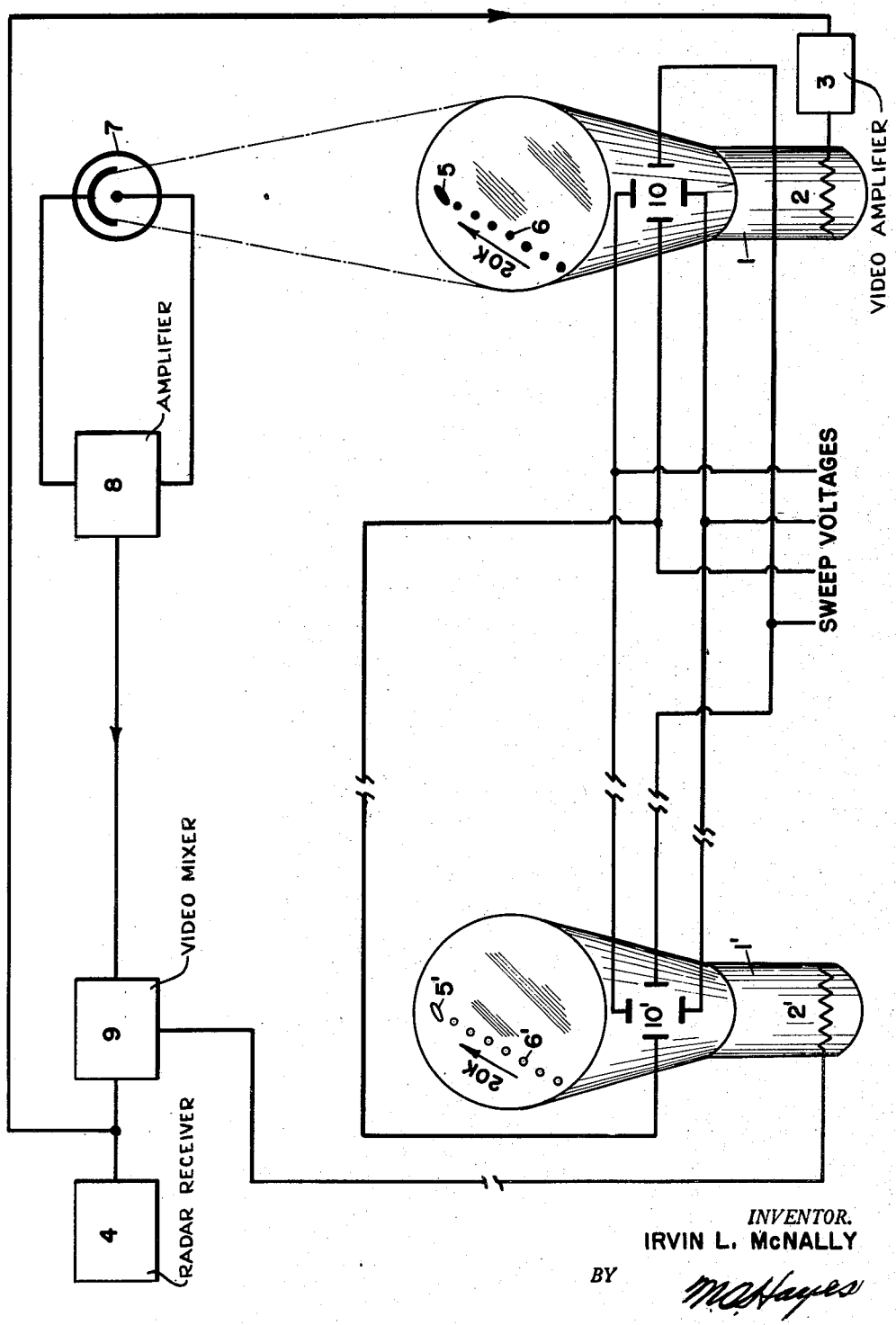
*INVENTOR.*
IRVIN L. McNALLY
BY
*M. C. Hayes*
ATTORNEY Patented Sept. 19, 1950

2,522,528

UNITED STATES PATENT OFFICE 2,522,528

REPEATER INDICATOR

Irvin L. McNally, United States Navy

Application June 17, 1946, Serial No. 677,147

5 Claims. (Cl. 343—5)

(Granted under the act of March 3, 1883, as amended April 30, 1928; 370 O. G. 757)

This invention relates to devices for displaying plotted radar information at a remotely located position. The object of the invention is to transfer previously plotted information from the face of a master plotting tube to a remote repeater tube. A feature of the invention is the use of a photo-electric cell in combination with a pair of cathode ray tubes to transfer information manually marked on one tube screen to the other or remote screen.

A further feature of the invention is the use of a video mixer stage to allow presentation of both signal information and plotted information on the remote cathode ray tube screen.

A still further feature is the use of negative or reverse video presentation on the master oscilloscope so that opaque marks may be used to represent targets present on previous scans.

Further objects and features not specifically enumerated will be apparent by reference to the following detailed description taken in connection with the drawings in which is shown a block diagram of my invention as applied to a radar system.

In this drawing there are shown two cathode ray tubes, I and I', tube I being the master plotting room screen and tube I', a remote indicator screen.

Applied to the grid 2 of tube I through a video amplifier 3 are signals from the radar receiver 4 with such polarity that the presentation of the target on screen I is as a dark area in a bright background rather than the more usual bright area on a dark background.

If a moving target 5, such as a ship or airplane, is to be traced, its position 6 at successive times is marked where it appears on the face of tube I with a black opaque marking material such as a grease pencil. Other information such as the speed of the target 5 and its direction of movement may also be marked on the face of tube I in a similar manner as indicated by the legend "20K" and the arrow.

The spot on the remote indicator tube I' is caused to move in exactly the same manner as that on tube I by applying the same sweep voltages to the deflecting means 10 and 10' of both tubes.

As the electron beam scans the screen of tube I, its intensity is modulated in accordance with the signal information from the radar receiver. In addition to this modulation, the light intensity radiated from the spot on the screen is varied by the presence of the opaque marks 6 on the screen of the tube and the other information marked on the face of the tube.

A photoelectric cell 7 responds to the instantaneous variations in radiated light intensity of the spot and the resulting pulses are amplified by photoelectric cell amplifier 8 and applied to a video mixer 9 to which is also applied a video signal from the radar, in such polarity as to produce bright targets on a dark background when applied to the grid 2' of tube I'. Both the radar information and the voltage variations from the photoelectric cell are applied to grid 2', producing on tube I' both current targets 5' and the plotted information 6', the arrow, and the legend "20K" marked on the screen of tube I by the grease marks.

While I have described my invention in certain preferred embodiments, I desire that it be understood that I do not desire to limit the scope of my invention except as it may be limited by the scope of the appended claims. For example, it is obviously possible to apply this system to an existing multiple repeater system with the addition to the connecting cables of only one additional video cable.

This invention may be manufactured and used by or for the Government of the United States of America without the payment of any royalty thereon or therefor.

Having described my invention, I claim:

1. In an echo ranging system having a first cathode ray tube and one or more remotely located cathode ray tubes, the method of reproducing plotted information at a remote point which comprises applying echo ranging data to the first cathode ray tube with such polarity as to depict targets as dark spots on a light background; simultaneously applying said data to one or more remotely located cathode ray tubes with reversed polarity so as to depict said targets as light spots on a dark background; marking successive positions of a moving target and other desired information on the face of said first cathode ray tube with an opaque marking material; translating to electrical variations the instantaneous variations of the light intensity radiated by the moving spot on the screen of said first cathode ray tube during each sweep, as produced both by modulation of the beam according to echo ranging information and by the opacity of the marked spots on the screen; amplifying said variations, and applying said variations to said remote cathode ray tube or tubes with such polarity as to produce bright targets on a dark background.

2. In an electronic system for echo ranging, a receiver producing echo ranging signals, first and second cathode ray tubes responsive to echo ranging signals, electronic means for transferring luminiferous detail from the first cathode ray tube to the second cathode ray tube, including opaquely marked points manually plotted on the face of said first cathode ray tube and echo ranging luminiferous detail electronically reproduced thereon, and means comprising a photo-electric cell and amplifier responsive thereto, said photoelectric cell being directed at said face of the first cathode ray tube for response according to the brightness of the spot thereon and said amplifier output being connected to the grid of the second cathode ray tube for modulating the signal response of said second cathode ray tube.

3. In an electronic system for echo ranging, a receiver producing echo ranging signal voltages adapted for control of spot brightness in a cathode ray tube to indicate target locations, first and second cathode ray tubes, means for producing a radial sweep on each of said tubes, said sweeps being in synchronization, means for applying to said tubes in opposite electrical sign said signal voltages, means for marking past targets on one of said cathode ray tubes, means for transferring electronically said marks from said cathode ray tube to the unmarked cathode ray tube, said means consisting of a photo-electric cell, an amplifier connected to said cell, and a mixer stage connected to said receiver and said amplifier and having the output thereof connected to the grid of the unmarked cathode ray tube.

4. In an echo ranging system having a cathode ray means provided with a screen at a plotting position and a second cathode ray tube at a point of reproduction, the method of reproduction of information plotted at a position remote from the point of reproduction which comprises applying the impulses from said echo ranging system in such a manner that the objects detected appear on the cathode ray tube screen at the plotting position as dark areas in a light background, placing opaque marks manually on said screen to indicate desired information, scanning said marks by said cathode ray means, resolving the resulting light variations into electrical variations, amplifying and inverting said electrical variations, applying said electrical variations to a second cathode ray tube at the point of reproduction in conjunction with the information from the echo ranging system to produce a superposition of said two types of information at the reproducing point.

5. A combination as described in claim 2 in which said modulating means includes a mixer responsive to echo ranging signals and connected to said amplifier.

IRVIN L. McNALLY.

REFERENCES CITED

The following references are of record in the file of this patent:

UNITED STATES PATENTS

| Number | Name | Date |
|---|---|---|
| 2,037,035 | Lubcke | Apr. 14, 1936 |
| 2,234,806 | Ploke | Mar. 11, 1941 |
| 2,406,751 | Emerson | Sept. 3, 1946 |
| 2,409,456 | Tolson | Oct. 15, 1946 |
| 2,412,669 | Bedford | Dec. 17, 1946 |
| 2,412,670 | Epstein | Dec. 17, 1946 |